United States Patent [19]

Schmidt

[11] 4,165,897

[45] Aug. 28, 1979

[54] REFUSE COMPACTOR WITH A COUNTERBALANCED REAR DOOR

[75] Inventor: Lewis W. Schmidt, Rio Vista, Calif.

[73] Assignee: Blackwelders, Rio Vista, Calif.

[21] Appl. No.: 914,789

[22] Filed: Jun. 12, 1978

[51] Int. Cl.² .............................................. B60P 1/26
[52] U.S. Cl. ...................................... 296/56; 49/386; 298/23 R
[58] Field of Search .................... 296/56; 49/386, 387, 49/280; 298/231 MD; 214/757

[56] References Cited

U.S. PATENT DOCUMENTS

| | | | |
|---|---|---|---|
| 1,966,934 | 7/1934 | Scheineman et al. | 49/387 |
| 2,220,766 | 11/1940 | Hubbs | 49/386 |
| 3,860,288 | 1/1975 | Martin et al. | 298/23 MD |

Primary Examiner—Richard A. Bertson
Attorney, Agent, or Firm—Roger B. Webster

[57] ABSTRACT

An improvement in a heavy-duty refuse compactor which includes a large capacity container having an initially open rear end normally closed by a top-hinged, releasably-locked door adapted to be swung upward to an open position for discharge of refuse from the container; the improvement comprising a counterbalance mechanism, connected between the container and the door, arranged to assist in the manual opening and closing of the door by the operator, and to permit such opening and closing from a convenient position. The counterbalance mechanism includes a novel link and lever array wherein the lever carries a heavy counterweight.

5 Claims, 7 Drawing Figures

REFUSE COMPACTOR WITH A COUNTERBALANCED REAR DOOR

BACKGROUND OF THE INVENTION

1. Field of the Invention

In refuse compactors of the type described, the rear door (unless power actuated) is difficult to open and close, and an operator—when the door is manually opened and closed—frequently experiences difficulty in accomplishing the task. Efforts, heretofore, to provide mechanical leverage aids for the purpose have, in many instances, met with little acceptance because of attendant problems of cost and effectiveness. The present invention was conceived in a successful effort to provide a most effective counterbalance mechanism for such a door.

2. The Prior Art

U.S. Pat. Nos. 3,072,439; 3,440,764; 3,721,469; 3,830,542; 3,860,288 and 3,905,493 represent the most relevant prior art known to applicant.

The above prior art—considered singly or together—does not anticipate, nor suggest as obvious, the particular structure of the herein-claimed door counterbalancing mechanism for a refuse compactor, and applicant has no knowledge of any prior art disclosing such particular structure.

SUMMARY OF THE INVENTION

The present invention provides, as a major object, an improvement in a heavy-duty refuse compactor which includes a large capacity container having an initially open rear end normally closed by a top-hinged, releasably-locked door adapted to be swung upward to an open position for discharge of refuse from the container; the improvement comprising a counterbalance mechanism, connected between the container and the door, arranged to assist in the manual opening and closing of the door by the operator, and to permit such opening and closing from a convenient position.

The present invention provides, as another important object, a counterbalance mechanism—as in the preceding paragraph—which includes a novel link and lever array wherein the lever carries a heavy counterweight which—in one position of the lever—aids manual opening of the door, and—in another position of the lever—aids manual closing of the door.

The present invention provides, as a further object, a door counterbalancing mechanism for a refuse compactor which is designed for ease and economy of manufacture.

The present invention provides, as a still further object, a practical, reliable, and durable door counterbalancing mechanism for a refuse compactor, and one which is exceedingly effective for the purpose for which it is designed.

DESCRIPTION OF THE PREFERRED EMBODIMENT

Figure 1:
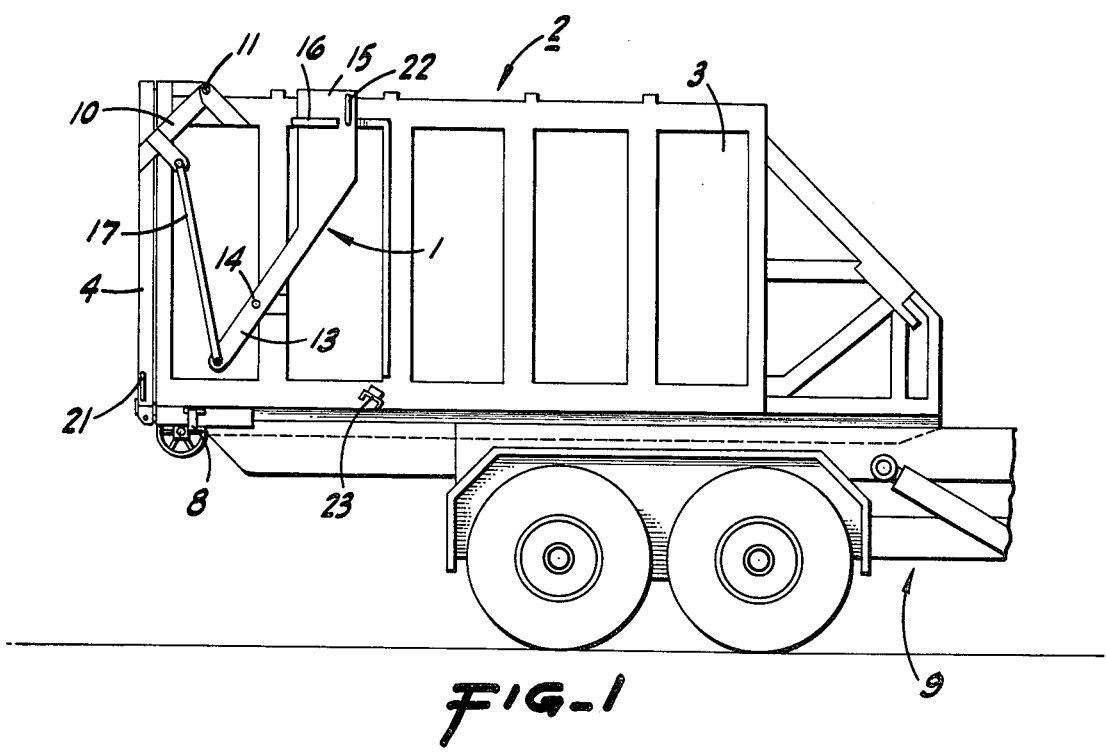
FIG. 1 is a side elevation of the refuse compactor as supported on a transport truck and in position preparatory to discharge of refuse from the container; the rear door being closed, and the counterbalance mechanism being in its initial position.

Referring now more particularly to the drawings and to the characters of reference marked thereon, the counterbalance mechanism of the present invention is indicated generally at 1 and is embodied on a substantially conventional, heavy-duty refuse compactor, indicated generally at 2, which includes a longitudinal, large capacity, closed-top container 3 having an initially open rear end normally closed by a top-hinged, releasably-locked, door 4 which engages a border seal 5 on such end of the container. The door is normally held in a tightly closed, releasably-locked position by a device—on each side of container 3 at the bottom rear corner—which includes a container-mounted, rotatable screw 6 threaded in a nut 7 on the door; the screw 6 including a manually accessible operating head 8.

The compactor 2 is, for transport to a refuse dump, carried on a transport truck 9, and—preparatory to discharging refuse from the container 3—the latter is shifted rearward on the truck and to the position shown in FIG. 1.

Figure 3:
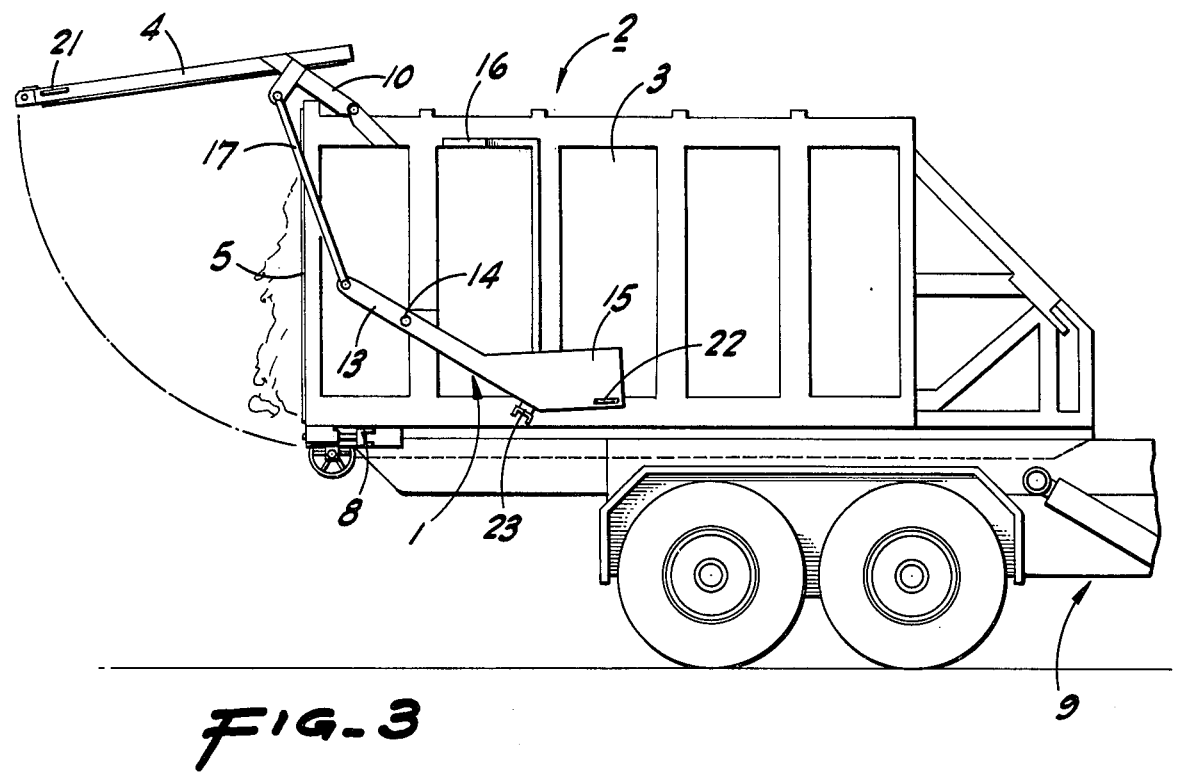
FIG. 3 is a further similar view, but shows the position of the counterbalance mechanism when the rear door is fully open.

The top hinge for the door 4 comprises, at each side of the door, a hinge arm 10 fixed on the side edge of the door adjacent but short of its upper end; the hinge arm 10 inclining upwardly and forwardly to pivotal interconnection, as at 11, with a related hinge arm 12 fixed on the container at the top and inclining upwardly and rearwardly to said pivot 11, and whose axis is slightly above the major horizontal plane of the top of the container 3 and slightly ahead of the rear end thereof. As so hinged, the door 4, when fully open, entirely clears the then open rear end of the container and so that there is no obstruction of the discharge of refuse from said container. See FIGS. 3 and 4.

The counterbalance mechanism 1—and of which there is an identic arrangement on each side of the container 3 at the rear portion thereof—comprises the following in connection between the door 4 and said container.

A heavy-duty lever 13 is pivoted, as at 14, in connection with the side of container 3 at a point adjacent but short of the rear end thereof and above its bottom a distance less than half the height of said container. The lever 13 is normally disposed at an upward and forward incline from pivot 14, and—at its then upper end—such lever is formed with an upstanding counterweight 15 of substantial size and weight. The counterweight 15 is laterally flat-faced and normally engages in a forwardly opening, cradle-like retainer 16 on the container 3; the retainer, when the counterweight 15 is engaged therein, limiting upward swinging of lever 13 as well as preventing side play of both the counterweight and lever during transport of the compactor.

The portion of lever 13 below the pivot 14 is of substantial less length than the lever portion above such pivot; this for the purpose of enhancement of the leverage with respect to the lower end of said lever.

An elongated link 17 is pivotally connected at its lower end, as at 18, to the lower end of lever 13, and such link normally extends at an upward and rearward incline to pivotal connection at its upper end, as at 19, to an ear 20 fixed on and projecting from the hinge arm 10 intermediate the ends of the latter.

The door 4 is provided on each side and adjacent the bottom with a fixed handle or grip 21, while a similar handle or grip 22 is fixed on the outer side of the counterweight 15.

Figure 5:
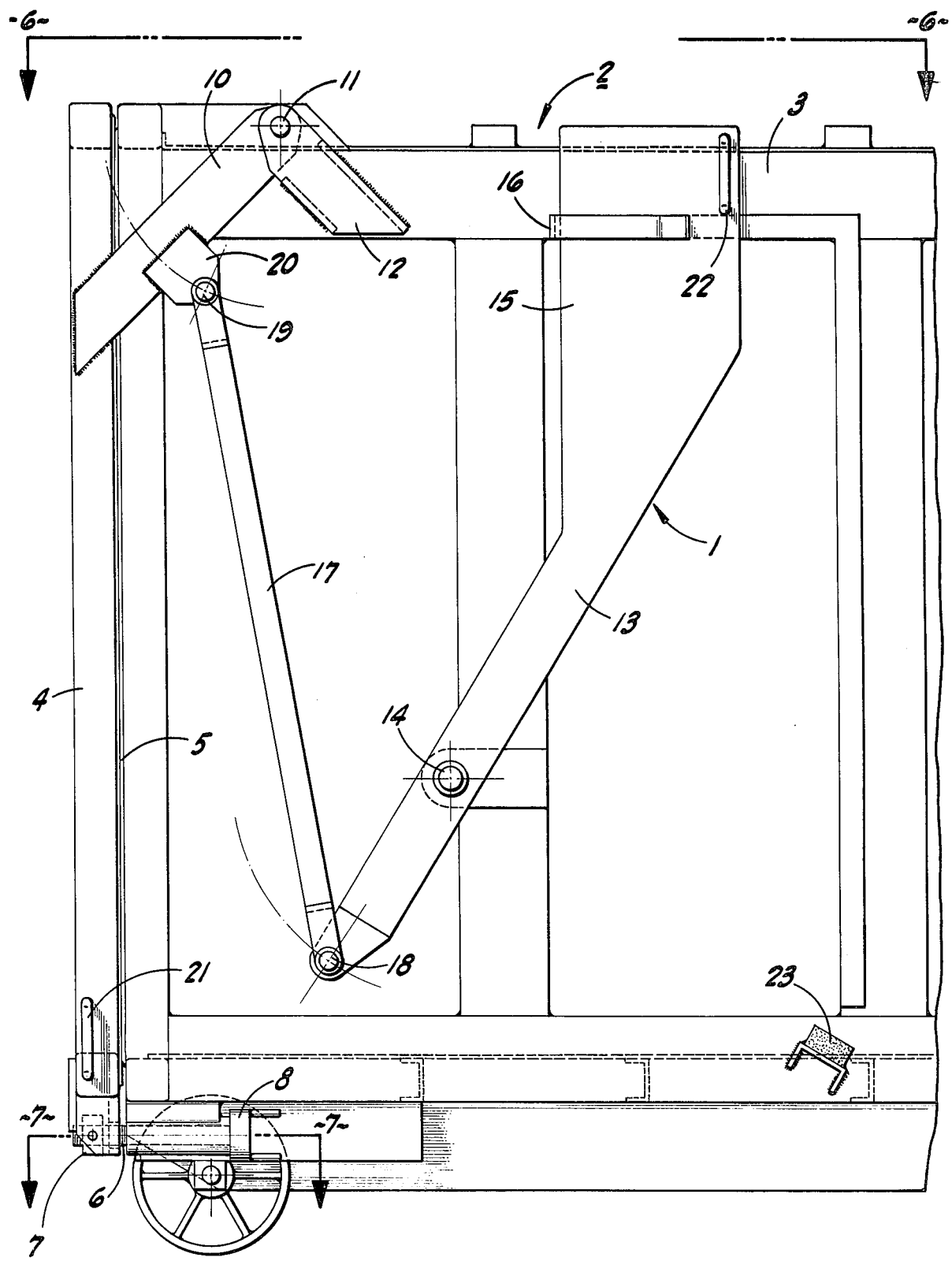
FIG. 5 is an enlarged, fragmentary side elevation of the compactor, with the door locked and the counterbalance mechanism disposed as in FIG. 1.
Figure 6:
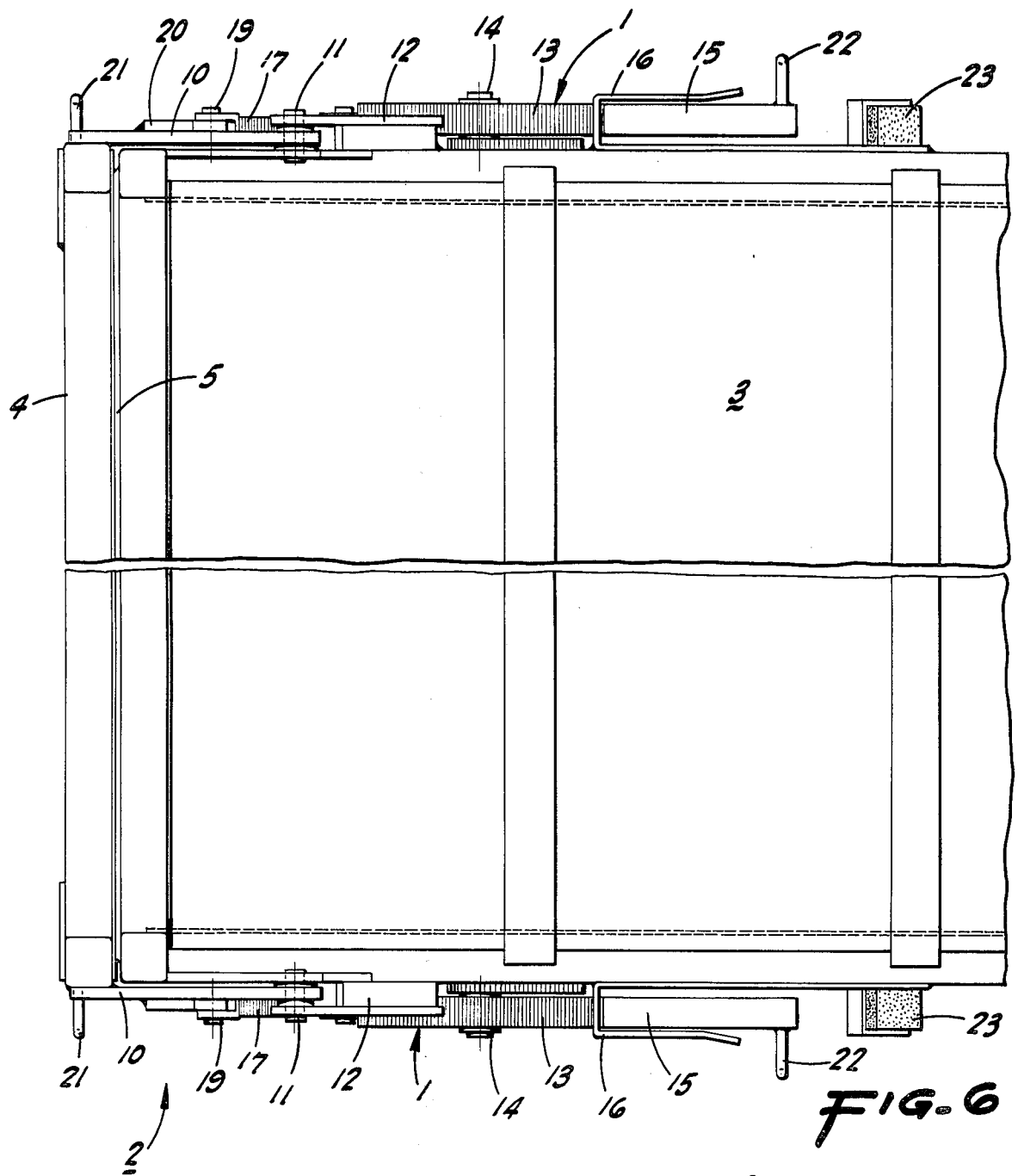
FIG. 6 is a fragmentary plan view taken substantially on line 6—6 of FIG. 5.
Figure 7:
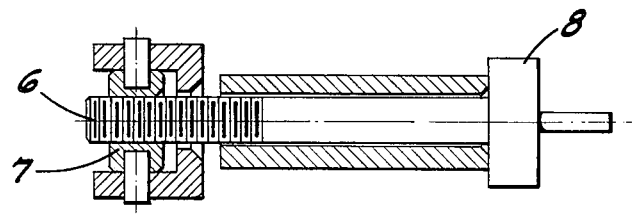
FIG. 7 is a fragmentary sectional plan view taken substantially on line 7—7 of FIG. 5.

When the container 3 of the compactor is to be emptied at a dump, such container is first moved to the position on the transport truck 9 as shown in FIG. 1; the door 4, at the outset, being closed and locked as shown in said FIG. 1 and also in FIG. 5.

Figure 2:
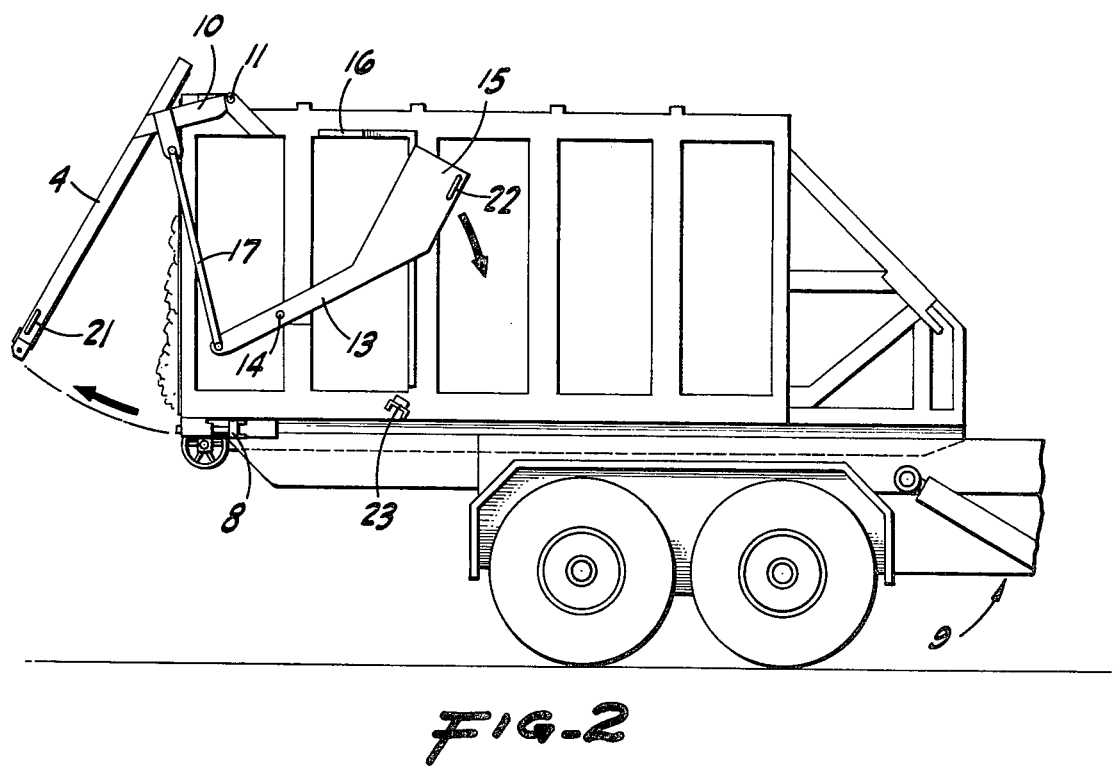
FIG. 2 is a similar view, but shows the position of the counterbalance mechanism when the rear door is partially open.

Nextly, the screws 6 on both sides of the container 3 are released from the nuts 7 by rotation of the operating heads 8. This frees the door, and the operator then hand-engages one of the grips 21 and manually initiates opening movement of the door and to a partially open position. See FIG. 2. At the same time, the counterweight 15 moves out of the retainer 16 and—under momentum—starts to swing downward. The door, with continued downward swinging of the counterweight, is swung upward toward open position; the door being fully open upon the counterweight passing dead center and engaging a stop 23 on the container at a low point on the side thereof. See FIG. 3. The force exerted by movement of the counterweighted lever 13 on the link 17, and which force is then transmitted to the door through hinge arm 10, is quite sufficient to assure of ready opening of said door.

Thus, with a minimum of effort by the operator, and through the medium of the described link, lever, and counterweight array, the door—as counterbalanced—is opened easily and conveniently and with maximum safety to the operator.

Figure 4:
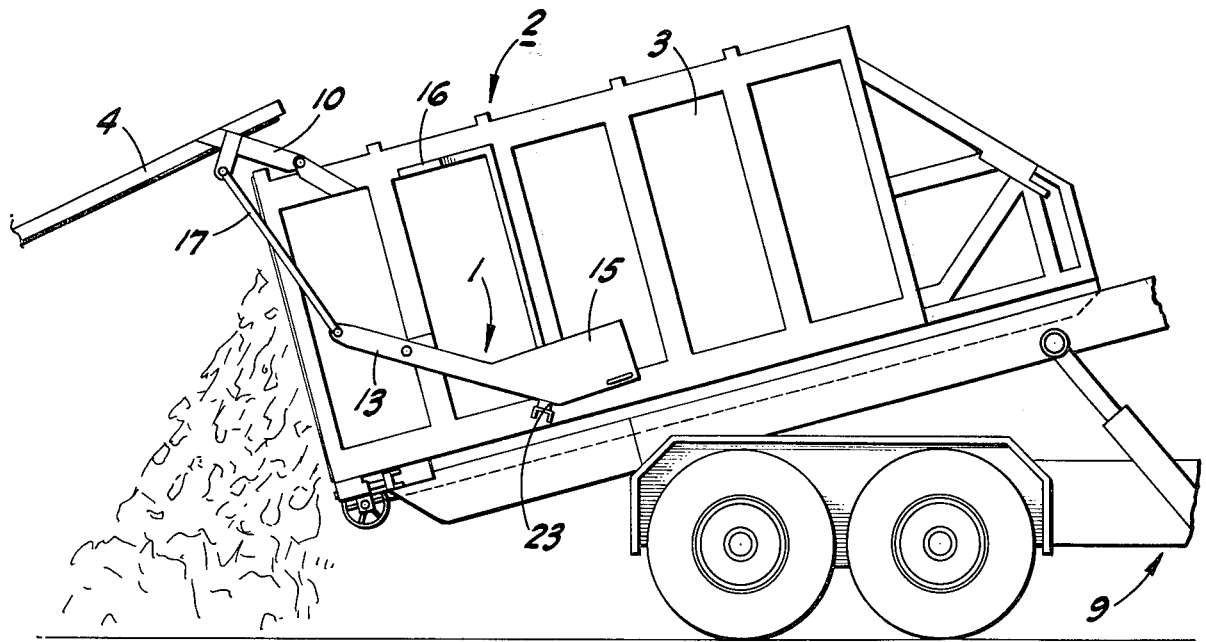
FIG. 4 is a view showing discharge of refuse from the container when the rear door is fully open as in FIG. 3, and the container tilted rearward for such discharge of the refuse.

After the door 4 is fully opened, and so remains, as above described, the container 3 is tilted to the rear, by conventional apparatus on the transport truck 9, whereupon the load of compacted refuse discharges by gravity from the rear end of said container as shown in FIG. 4.

Upon the refuse being discharged therefrom and the container 3 returned to normal horizontal position, the operator hand-engages the grip 22 on the then lowered, stop-engaging counterweight 15 and imparts to the latter an upward push, and which is sufficient to carry the counterweight upward past dead center and to a position at least approaching the retainer 16. This swings the door 4 downward to a lowered position such that the grip 21 is readily accessible to the operator, and who then, if necessary, hand-engages said grip 21 and completes closure of the door, and at which time the counterweight 15 re-enters the retainer 16. The operator, as the final step, re-engages screws 6 in nuts 7 and tightens the screws by rotation of heads 8.

From the foregoing description, it will be readily seen that there has been produced such a door counterbalancing mechanism for a refuse compactor as substantially fulfills the objects of the invention as set forth herein.

While this specification sets forth in detail the present and preferred construction of the door counterbalancing mechanism for a refuse compactor, still in practice such deviations from such detail may be resorted to as do not form a departure from the spirit of the invention as defined by the appended claims.

I claim:

1. A door counterbalancing mechanism for a refuse compactor which includes a container normally closed at one end by a top-hinged releasably-locked door adapted to be swung upward to an open position for discharge of refuse from the container; the door counterbalancing mechanism comprising, in combination with at least one side of the container and the door, a rigid elongated lever pivoted intermediate its ends exteriorly of and on said side of the container, the lever normally inclining upwardly from its pivot in a direction away from the door, a counterweight directly on the upper end portion of the lever, an upstanding link pivotally connected at its lower end to the lower end of the lever, the link normally inclining upwardly from said lower end pivot in a direction toward the door, and means including a pivot connecting the upper end of the link to the door adjacent the top of the latter but normally below the hinge axis.

2. A door counterbalancing mechanism, as in claim 1, in which the length of the lever above its pivot is substantially greater than below its pivot.

3. A door counterbalancing mechanism, as in claim 1, including an exposed hand grip on the door at one side and adjacent the bottom thereof, and another exposed hand grip on the counterweight.

4. A door counterbalancing mechanism for a refuse compactor which includes a container normally closed at one end by a top-hinged releasably-locked door adapted to be swung upward to an open position for discharge of refuse from the container; the door counterbalancing mechanism comprising, in combination with at least one side of the container and the door, a lever pivoted intermediate its ends on said side of the container, the lever normally inclining upwardly from its pivot in a direction away from the door, a counterweight on the upper end portion of the lever, and an upstanding link pivotally connected at its lower end to the lower end of the lever, and means including a pivot connecting the upper end of the link to the door adjacent the top of the latter but normally below the hinge axis, the link normally inclining upwardly from its lower end pivot in a direction toward the door; there being a cradle-like retainer on said side of the container, and the counterweight normally being engaged in such retainer; the counterweight escaping the retainer upon downward swinging of the portion of the lever above its pivot whereby to impart an up-thrust on the link and resultant opening movement of the door.

5. A door counterbalancing mechanism, as in claim 4, including a stop, on the side of the container, positioned for engagement by the counterweight upon predetermined downward swinging of said portion of the lever; the door being fully open when the counterweight engages the stop.

* * * * *